United States Patent
Reeves

(10) Patent No.: US 9,202,026 B1
(45) Date of Patent: Dec. 1, 2015

(54) MANAGING REAL TIME ACCESS MANAGEMENT TO PERSONAL INFORMATION

(71) Applicant: Robert B Reeves, Manchester, NH (US)

(72) Inventor: Robert B Reeves, Manchester, NH (US)

( * ) Notice: Subject to any disclaimer, the term of this patent is extended or adjusted under 35 U.S.C. 154(b) by 0 days.

(21) Appl. No.: 13/668,402

(22) Filed: Nov. 5, 2012

Related U.S. Application Data

(60) Provisional application No. 61/555,368, filed on Nov. 3, 2011.

(51) Int. Cl.
  *G06F 7/04* (2006.01)
  *G06F 21/30* (2013.01)
  *G06F 21/62* (2013.01)

(52) U.S. Cl.
  CPC ............ *G06F 21/30* (2013.01); *G06F 21/6245* (2013.01)

(58) Field of Classification Search
  CPC ......... G06F 21/10; G06F 21/30; G06F 21/31; G06F 21/60; G06F 21/6245; G06F 21/6218; G06F 2221/2141; H04L 63/08; H04L 63/102; H04L 9/32; H04L 29/06
  See application file for complete search history.

(56) References Cited

U.S. PATENT DOCUMENTS

| | | | | |
|---|---|---|---|---|
| 7,003,669 B2 * | 2/2006 | Monk | .................... | G06Q 50/26 713/168 |
| 2007/0204162 A1 * | 8/2007 | Rodriguez | ............... | H04K 1/00 713/176 |
| 2008/0168062 A1 * | 7/2008 | Reeves | ............... | G07C 9/00087 |
| 2008/0174100 A1 * | 7/2008 | Reeves | .................... | G06Q 50/18 283/70 |
| 2009/0254747 A1 * | 10/2009 | Bussani | .............. | H04L 63/0853 713/168 |
| 2012/0311684 A1 * | 12/2012 | Paulsen | ............... | H04L 63/0815 726/6 |

FOREIGN PATENT DOCUMENTS

EP    1610528 A2 * 12/2005

OTHER PUBLICATIONS

Paulsen, Kobus, "Systems and Methods for Registration and Validation of Users Over Multiple Websites", Jun. 2011, U.S. Appl. No. 61/520,164, pp. 56-57.*

* cited by examiner

*Primary Examiner* — Michael Pyzocha
*Assistant Examiner* — Gregory M Elmore
(74) *Attorney, Agent, or Firm* — Joseph E. Funk

(57) ABSTRACT

Apparatus is disclosed for verifying the validity of documents and biometrics submitted by individuals at a document verification terminal, or the use of an e-token with appropriate information thereon in an encrypted manner, so they may perform some action such as purchase an alcoholic beverage or enter a highly secure governmental facility. A Validation Privacy Server and its associated Validation Privacy Database store the results of previous document and biometric validity checks using governmental databases, to be used for subsequent submissions of the same document for the same purpose. In this manner governmental databases are not overloaded with mundane document and personal validity checks every time a document is used for the same purpose. The storage of the results of document checking by the Validation Privacy Server and its associated Validation Privacy Database may be performed with or without the approval of the individual depending on privacy determinations as to the accessibility of the information.

7 Claims, 1 Drawing Sheet

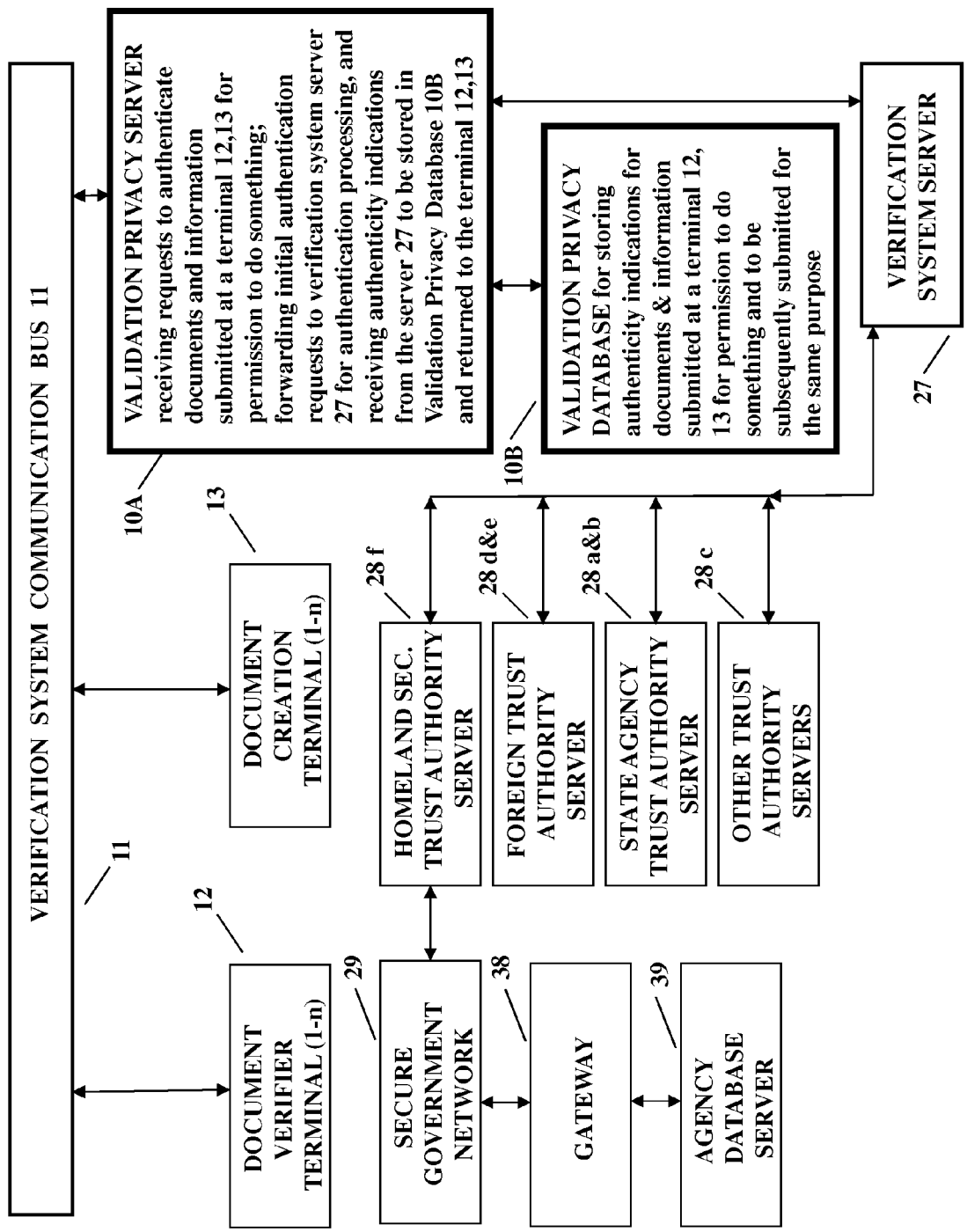

US 9,202,026 B1

MANAGING REAL TIME ACCESS MANAGEMENT TO PERSONAL INFORMATION

RELATED APPLICATION

This utility patent application claims benefit under U.S. Provisional Patent Application No. 61/555,368, entitled "Real Time Access Management To Personal Information", filed on Nov. 3, 2011.

FIELD OF THE INVENTION

This invention relates to apparatus for validating the identity of a person and the validity of documents they present, while limiting the personal identity information (PII) disclosed for any user to perform such a validation and which disclosure matches voluntary disclosure limits established by the person whose identity information is being validated.

BACKGROUND OF THE INVENTION

In this paragraph all references to elements and their reference numbers are in U.S. Pat. No. 7,003,669. In a system such as described in U.S. Pat. No. 7,003,669 (which is incorporated herein by reference) data (input/output) terminals 12,13 are generally used for two purposes. One type of terminal 12 is used to verify/validate user documents of all types (drivers licenses, admittance passes, passports, etc.), and the other type of terminal 13 is used for the creation of user documents of all types (such as drivers licenses, admittance passes, passports, etc.). In accordance with the teaching of the above cited patent both types of terminals 12,13 access various types of database servers (e.g. 39) at different levels of federal, state and local government via trust authority servers 28a-f, and can access certain non-governmental servers in business and industry. Access to these many database servers (e.g. 39) is via verification system servers 27 and trust authority servers 28a-f which protects against open access to these servers. For an added layer of protection those database servers (e.g. 39) behind a trust authority server 28a-f may have a gateway server (e.g. 38) through which they are accessed along with privacy protecting protocols whereby return information is limited to yes/no that the presented data does or does not match the trust authority personal identity information (PII) data. These extra servers and gateways prevent unauthorized access to the database servers (e.g. 39) and, at the same time, provide privacy to a person's personal information that is stored therein where conventional data bases do not provide such protection of PII information. With some access being provided to such personal information for specific, acceptable purposes privacy is still preserved in that after checking information in such databases very limited information may be obtained, or only a YES or NO is returned from the database following access thereto to check certain data. None of these trust authority servers 28a-f or commercial data provider servers currently provide a mechanism whereby the rules of use of personal identity information PII are consented to at the time of enrollment.

In this paragraph all references to elements, their reference numbers and Figures are in U.S. Pat. No. 7,003,669. Presently, a person may go into a store to purchase alcoholic beverages. They present a driver's license to prove they are of age to purchase the beverages. The purchase is completed. The drivers license may be valid except that a corrupt official wrongfully issued the license. For a store employee to be reasonably sure the presented driver's license or other government issued ID is both valid and belongs to the individual presenting it, the employee can rely only on the their own familiarity with the ID presented and try to assess whether the photo (if any) on the presented ID matched the presenter. This is not always simple and the employee is not equipped to determine the validity of the ID. The store employee most often cannot connect to an appropriate trust authority database to verify the validity of a presented document. Even if the employee could, there is no guarantee the identity he is validating belongs to the presenter without first validating the presented ID. There have been more and more counterfeit documents, and more and more apparently valid documents issued by corrupt officials. Other examples are counterfeit or wrongfully issued documents, such as passports, used by terrorists. U.S. Pat. No. 7,003,669 teaches access to state (DMV [24], law enforcement [23] and travel reservation [25] (FIG. 2) and other database servers) through a verification system server [10] (FIG. 2) and to government database servers [26 through 37] (FIG. 2) via a homeland security trust authority server [28f] (FIG. 2). However, having to access such governmental servers for low risk transactions such as purchasing an alcoholic beverage places an undue access demand on some of the databases and their servers, such as some governmental databases 30-39 (FIG. 1) accessed through high security government trust authority servers 28f (FIG. 1). In addition, accessing governmental servers for such things as purchasing an alcoholic beverage accesses more databases and information in those databases 30-39 (FIG. 1) associated with those trust authority servers 28a-f (FIG. 1) than is reasonably necessary to verify an identity document for low risk uses such as purchasing an alcoholic beverage.

Thus, there is a need for new, user friendly, commercial, databases and servers that are constructed using protocols enabling virtually anonymous low risk uses, such as purchasing an alcoholic beverage, while confirming additional personal identity information (PII) information for use with higher security requirements such as employment background checks, both of which examples are within the consent provided by a person at the time of their enrollment into the new databases listing verified identity documents, pictures and containing biometric information such as fingerprints and iris scans that are used for identification purposes.

SUMMARY OF THE INVENTION

In this paragraph all references to elements, their reference numbers and Figures are in the drawing of the present patent application. The present invention is enabled by a new, intermediate server called herein a Validation Privacy Server 10A with its Validation Privacy Database 10B, that solves the aforementioned problems in the prior art. The new Validation Privacy Server is connected only to verification system server 27 (element 10 in FIG. 1 of U.S. Pat. No. 7,003,669) subscribing to new Validation Privacy Server protocols, such protocols including both an opt-in privacy consent by a person for storage and use of minimal personal data of theirs under the Validation Privacy Server protocol, as well as a designation of the level of confidence a user validating a submitted document using the Validation Privacy Server 10A can have in the personal identity information stored in the Validation Privacy Database 10B according to the protocol agreed to between a database information provider to be utilized to validate submitted documents and the Validation Privacy Server 10A.

With reference to FIG. 1 in U.S. Pat. No. 7,003,669 the new Validation Privacy Server 10A is typically located between the Verification System Communication Bus 11 and the Verification System Server 27. This is shown in the applicant's FIG. 1 but Server 27 is Server 10 in U.S. Pat. No. 7,003,669. By the established, agreed to protocol between a database information provider and the Validation Privacy Server 10A, a minimal amount of personal information of a person who has agreed to be enrolled under the new Validation Privacy Server 10A is contained in its Validation Privacy Database 10B. The presence of personal identity information (PII) of an individual in the new Validation Privacy Database 10B is based on a validated, voluntary enrollment by the enrollee. This includes authentication that a government issued document (e.g. ID) submitted by a person for the voluntary enrollment is not a fake and is authentic, followed by validation of the document to assure that it has been validly issued, coupled with conventional conformation of the enrollee's identity including knowledge based confirmation of the presented identity's historical facts. The degree of checking, and to what resources, to validate a document, following authentication, depends on the security level of the document. That is, the level of checking to validate a driver's license is much less than that to validate a pass to a high security government installation. Stated another way, the level of checking for validation of a document submitted for enrollment under Validation Privacy Server 10A depends on the level of security required when subsequently using the document for permission to do something. At the low end the level of checking a driver's license to purchase an alcoholic beverage is much less than the checking involved in validating a document used for admission to a highly secure government facility. In addition, the person submitting a document for enrollment under Validation Privacy Server 10A selects what data will be entered in Validation Privacy Database 10B and what it can be used for.

Following such voluntary enrollment under Validation Privacy Server 10A all subsequent validations of the last mentioned government issued document used for enrollment are then performed only by Validation Privacy Server 10A according to its operating protocol and with minimal personal identity information disclosed at a document verifier terminal 12 from which validation of the government issued ID is being requested, using anonymous methods to the extent practical. The terminals are located at liquor stores, bars, airline desks, banks, etc. With minimal data in Validation Privacy Database 10B the document may be submitted at a later time to obtain permission to do a very low security thing (purchase an alcoholic beverage), but the same document cannot be used to obtain permission to do something that has a higher security risk since certain information on or concerning the submitted document has not been approved by the person for inclusion in Validation Privacy Database 10B.

By using the new Validation Privacy Servers 10A and Validation Privacy Databases 10B an undue load on high security government databases and servers for checking identity documents for low risk uses is minimized. The present invention when fully deployed in commerce should replace a large majority of the confirmations and demands on the aforementioned trust authority servers and databases while at the same time reducing materially the free flow of PII exchange in commerce.

DESCRIPTION OF THE DRAWING

The invention will be better understood upon reading the following Detailed Description in conjunction with the drawing in which:

FIG. 1 is a block diagram of a document creation and document verifier system with which the novel Validation Privacy Server and Validation Privacy Database function.

DETAILED DESCRIPTION

Better equipment for verifying information submitted to obtain identity documents, and verifying issued identity documents by checking to determine if they are counterfeit or have been altered is improved by an identity verification infrastructure such as taught in U.S. Pat. No. 7,003,669. This prior art system greatly reduces the ease in fraudulently obtaining a driver's license, state identity card, birth certificate, and Social Security number; and in detecting the wrongful use of such fraudulently obtained and altered documents. This prior art system also reduces the occurrence of identity theft due to the prior ease in fraudulently obtaining a driver's license, state identity card, birth certificate, and Social Security number and then using those documents as proof of identity to obtain higher trust documents such as a passport or national ID cards.

In this paragraph all references to elements, their reference numbers and Figures are in U.S. Pat. No. 7,003,669. More particularly, in U.S. Pat. No. 7,003,669 the trust authority server 28($a$-$f$) (FIG. 1) for a database will compare information, such as a birth date retrieved by a document verifier terminal 12 (FIG. 1) from a submitted document against the birth date stored in its associated database and return a response of "match" or "no match" to the remote document verifier terminal 12 that initiated the inquiry for birth date verification. For another example, a trust authority server 28$a$-$f$ (FIG. 1) will compare other information, such as the submitted maiden name of a document applicant's mother, to such information stored in a birth record database and return a response of "match" or "no match" to a remote document creation terminal (1-$n$) 13 (FIG. 1) that initiated the inquiry. Alternatively, in cases where databases may be accessed more directly, but there is no trust authority server 28$a$-$f$ associated therewith, Verification System Server 10 (FIG. 1) may act as the trust authority, perform verification checks and return the same "match" or "no match" information comparison results to requesting ones of document verifier terminals 12 (FIG. 1). In this manner privacy issues are adequately addressed since there is no direct access to database contents, and actual information in the databases is not disclosed at a terminal 12 or 13 (FIG. 1). In some circumstances information retrieved from a database, such as a photo, will or cannot not be matched at the associated trust authority server 28$a$-$f$ (FIG. 1) but will instead be returned to the document verifier terminal (1-$n$) 12 (FIG. 1) from which the request was initiated, and a terminal operator will perform a manual comparison of the photo retrieved from the database with the document presenter.

An application for a minor to receive a Social Security number requires only the testimony of a parent. A driver's license, state identification card, passport or work permit are all linked to the birth certificate and/or the Social Security number. Therefore, no positive biometric link exists to the person who applies for and obtains such documents.

The certification/notification of death is even more poorly controlled. There is no flag placed on a birth record and, unless a deceased person has been collecting a Social Security benefit and Social Security was notified of the death, there is no retirement of the person's Social Security number or prevention of someone from assuming the identity of the deceased.

Even an alien residence card has little true security since there is no comprehensive process for verification that it was legitimately issued to the bearer. In addition, there is no accountability placed upon employers to authenticate the document or to verify that the bearer is the person to whom the document was issued. This high-security card has had little impact on "green card" forgery since earlier "green card" issues were never recalled and are therefore still accepted for identification. Hence, forgery of the older green cards works just as well.

In this paragraph all references to elements, their reference numbers and Figures are in the 7,003,669 patent except the last few sentences. U.S. Pat. No. 7,003,669 teaches increasing security by using of currently existing global identification documents and the distributed databases, where access to and data from the databases 30-39 (FIG. 1) are controlled by new trust trust authority servers 28*a-f* (FIG. 1), and privacy concerns are adequately addressed by greatly limiting dissemination of information from these databases. For one example, a trust authority server 28 *a-f* (FIG. 1) for a database will compare a birth date retrieved from a submitted document against the birth date stored in the server's associated database and return a response of "match" or "no match" to the remote document verification terminal 12 (FIG. 1) that initiated an inquiry for a birth date match. Even doing this simple type of check a large number of times will overload a trust authority server 28*a-f* (FIG. 1) and its database. In FIG. 1 of the present invention no other information in Validation Privacy Database 10B is returned to one of document verifier terminals (1-*n*) 12. For another example, a trust authority server (28*a-f*) will compare information read from a document submitted to do anything from purchase of an alcoholic beverage, to buying a ticket to travel, to other higher security applications.

Hereinafter, all references to elements and their reference numbers is with regards to FIG. 1 showing the invention. In the preferred embodiment of the invention initial enrollment by a person into the new privacy enhanced Validation Privacy Server 10A and Validation Privacy Database 10B described herein for this invention is performed according to the conventional "best practices" Personal Identification Verification ("PIV") enrollment specified under the FIPS201 as stated by the National institute of Standards (NIST). In the preferred embodiment of the invention described herein the Validation Privacy Server 10A and Validation Privacy Database 10B are each a general purpose computer with specific software running thereon to achieve the specific operations described herein. The aforementioned databases are presently created and maintained by the issuing authority for each document type and by other organizations that have the control authority or operational charter to do so as a part of their business model. New trust authorities authorized to access such databases can access the databases using standardized privacy protected ID data routing, and a query/response system focused on risk assessment.

Depending upon the intended use of a document verifier (1-*n*) 12, some of these terminals have additional equipment associated therewith. Examples are a fingerprint reader, and iris scanner, and a camera which are not shown in FIG. 1. With the present invention part of the Personal Identity Information ("PII") information retrieved from a data base via a trust authority server and stored in the Validation Privacy Database 10B for use in document verifications by Validation Privacy Server 10A may include fingerprints, iris scan information and pictures. As previously mentioned a person whose information is stored in Validation Privacy Database 10B must enroll and agree to have private information retrieved and stored in Validation Privacy Database 10B. To validate a submitted document previously, properly issued by a government agency, this information is retrieved from Validation Privacy Database 10B and returned to a document verifier terminal (1-*n*) 12 for use by a terminal operator in verifying the identity of the person submitting the document at the terminal. In some instances a document need not be submitted at a document verifier terminal (1-*n*) 12 for validation in order to be permitted to do something, such as purchase an alcoholic beverage. In lieu of a document validation a person may submit a biometric at the document verifier terminal (1-*n*) 12 (such as a fingerprint or iris scan) and the submitted biometric is compared to a retrieved biometric in Validation Privacy Database 10B either at the document verifier terminal (1-*n*) 12, at Validation Privacy Server 10A, or at some other location, and the comparison results are returned to the particular one of document verifier terminals (1-*n*) 12 as a "match" or "no match" to protect privacy. For security and privacy purposes all communications between the document verifier terminals (1-*n*) 12, communication bus 11, Validation Privacy Server 10A, Verification System Server 27 and the various governmental and non-governmental databases accessed via trust authority servers 28*a-f* are encrypted.

As an alternative to submitting a biometric at a document verifier terminal (1-*n*) 12 a person may submit an e-token to obtain permission to do something. An e-token maybe in different forms including a device that is inserted into a USB port of a computer like device such as depending upon the intended use of a document verifier terminal (1-*n*) 12, some of these terminals have additional equipment associated therewith. Examples are a fingerprint reader, and iris scanner, and a camera which are not shown in FIG. 1. With the present invention part of the Personal Identity Information ("PII") information retrieved from a data base via a trust authority server and stored in the Validation Privacy Database 10B for use in document verifications by Validation Privacy Server 10A may include fingerprints, iris scan information and pictures. As previously mentioned a person whose information is stored in Validation Privacy Database 10B must enroll and agree to have private information retrieved and stored in Validation Privacy Database 10B. To validate a submitted document previously, properly issued by a government agency, this information is retrieved from Validation Privacy Database 10B and returned to a document verifier terminal (1-*n*) 12 for use by a terminal operator in verifying the identity of the person submitting the document at the terminal. In some instances a document need not be submitted at a document verifier terminal (1-*n*) 12 for validation in order to be permitted to do something, such as purchase an alcoholic beverage. In lieu of a document validation a person may submit a biometric at the document verifier terminal (1-*n*) 12 (such as a fingerprint or iris scan) and the submitted biometric is compared to a retrieved biometric in Validation Privacy Database 10B either at the document verifier terminal (1-*n*) 12, at Validation Privacy Server 10A, or at some other location, and the comparison results are returned to the particular one of document verifier terminals (1-*n*) 12 as a "match" or "no match" to protect privacy. For security and privacy purposes all communications between the document verifier terminals (1-*n*) 12, communication bus 11, Validation Privacy Server 10A, Verification System Server 72 and the various governmental and non-governmental databases accessed via trust authority servers 28*a-f* are encrypted document verifier terminals (1-*n*) 12. Such e-tokens are part of a new technology referred to as U-PROVE. U-PROVE is an innovative cryptographic technology from MICROSOFT that allows users to minimally disclose certified information about themselves when interacting with online resource providers. U-Prove provides a superset of the security features of Public Key Infrastructure (PKI), and also provide strong privacy protections by offering superior user control and preventing unwanted user tracking. An e-token would be presented by a person at a document verifier terminal (1-*n*) 12 and would allow the person to prove information that is encrypted on the e-token device. Thus, no document validation need occur using Validation Privacy Server 10A. Users can minimally disclose information about what attributes are encoded in an e-token in response to dynamic verifier policies. An example would be presenting an e-token at a document verifier terminal (1-*n*) 12 in a liquor store and only age information on the e-token would be disclosed. As an example, a user may choose to only disclose a subset of the encoded attributes, prove that her undisclosed name does not appear on a blacklist, or prove that she is of age without disclosing her actual birthdate. These user-centric aspects make the U-Prove technology ideally suited to creating the digital equivalent of paper-based credentials and the plastic ID cards in one's wallet. An e-token may be presented at a document verifier terminal (1-*n*) 12 as proof to do something whether it be purchase an alcoholic beverage or obtain entry to highly secure facility, or to have another document issued at a document creation terminal (1-*n*) 13.

In brief summary of what has been described so far, accessing high level trust authority data bases to do common, low risk tasks that occur very often, such as checking documents (e.g. drivers license) submitted for purchasing alcoholic beverages, will overload the high level trust authority data bases and their associated trust authority servers 28*a-f* so, in accordance with the teaching of the present invention, an intermediate Validation Privacy Server 10A with Validation Privacy Database 10B are provided that initially cooperate with Verification System Server 27 to validate the authenticity of documents, such as the drivers licenses, typically submitted to perform low risk tasks such as purchasing alcoholic beverages or cash a check. When the person who submitted the document being validated has enrolled to use Validation Privacy Server 10A the approved, previous document validation results are stored in Validation Privacy Database 10B for use on subsequent occasions when the same person submits the same document for validation for the same purpose (e.g. purchase an alcoholic beverage or cash a check). This eliminates the need for high level trust authority data bases to validate documents submitted for low risk tasks and thereby slow them down. For example, information in a Division of Motor Vehicles (DMV) database includes a person's age, height, weight, color of eyes, and other restrictions such as a need for corrective glasses. However, only the age is of interest in initially validating a driver's license for the purchase of an alcoholic beverage. When a trust authority data base, a DMV in this example, is checked the one time to validate a driver's license, using the teaching of the invention only the age information is retrieved from the database and is compared to the age read from the submitted driver's license to validate the driver's license for the purchase of an alcoholic beverage. This protects a person's privacy in their other personal information in the DMV database. To do this Validation Privacy Server 10A, a document verifier terminal (1-*n*) 12, and the governmental (DMV) server, all operating under the new agreed to protocol, determine that only age information is to be retrieved from the DMV database, compared with the age on the submitted document (driver's license), and a "match" or "no match" indication is returned to Validation Privacy Server 10A. This validation result is stored in Validation Privacy Database 10B. The next time the same driver's license is submitted to purchase an alcoholic beverage Validation Privacy Server 10A initially checks Validation Privacy Database 10B, finds the previous validation result, and Validation Privacy Server 10A returns a "match" or "no match" indication to the document verifier terminal (1-*n*) 12 at which the driver's license has been submitted for validation. The DMV database is not needed to perform the validation and is not slowed down. As previously mentioned proof of age or other information may be on an e-token that is submitted by a person at a document verifier terminal (1-*n*) 12.

FIG. 1 shows a block diagram of a plurality of document verification terminals 12 (1-*n*), document creation terminals 13 (1-*n*), communication bus 11, verification system server 27, new Validation Privacy Server 10A, and new Validation Privacy Database 10B all connected together in a document verification system and working in conjunction with a network of trust authority databases (29, 38, 39) and associated trust authority servers (28 *a-f*) to verify the identity of individuals, documents and other information they submit when applying for issuance of new documents, and to later validate previously issued documents and the individuals to whom they are issued per the teaching of the present invention. The document creation terminals 13(1-*n*) and document verifier terminals 12(1-*n*) are all connected via verification system communication bus 11 to a verification system server 27 that is used to access a plurality of trust authority servers 28 *a-f* to verify information, documents and individuals as described in U.S. Pat. No. 7,003,669.

When identity and other documents are being applied for and issued at a document creation terminal 13(1-*n*) required information (including supporting documents) is forwarded from one of document creation terminals 13(1-*n*) via Verification System Communication Bus 11, Validation Privacy Server 10A and Verification System Server 27 to a number of other trust authority servers 28*a-f* and their associated databases (including 29, 38, 39) to have the validity of the submitted biometric information and supporting documents checked. That is, Validation Privacy Server 10A checks the request from document creation terminal 13, per its operating protocol and decides that it has no document checking function for documents submitted for issuing a new document, and forwards the request to Verification System Server 27. Server 27 functions as described in U.S. Pat. No. 7,003,669. Alternatively, if the required verification information is encrypted on an e-token the validation process using Verification System Server 27 may be dispensed with.

Per the teaching of the preferred operation of the invention, a person can enroll to have one or more of their documents authenticated and validated for enrollment with Validation Privacy Server 10A, and has agreed to and authorizes what information on their document(s) can be stored in Validation Privacy Database 10B and can be used later for document validation for approval to do something (eg purchase an alcoholic beverage). An example is as follows. Validation Privacy Server 10A first checks the type of document for which a document verifier terminal (1-*n*) 12 is requesting document validation and the level of checking required thereby (age etc.). This is part of the operating protocol between the two devices. If it is determined that a driver's license has been submitted to purchase an alcoholic beverage only the age stored in Validation Privacy Database 10B is retrieved to be compared to the age on the submitted driver's license. The age on the submitted driver's license is compared to the age stored in Validation Privacy Database 10B for the document. A decision is made as whether the two ages compare and a "match" or "no match" indication is returned to the verifier terminal (1-*n*) 12 that requested the validation. If the indication is "match' the person can purchase the alcoholic beverage. If the indication is "no match" the operator of the document verifier terminal (1-$n$) 12 takes appropriate action. In this manner maximum privacy is maintained of any other personal information of the person on the driver's license.

When a person/document owner has enrolled to have a document verified by Validation Privacy Server 10A, the document is authenticated and verified and the verified information on the document is stored in Validation Privacy Database 10B. As part of the enrollment the person authorizes what data on the document can be stored in Validation Privacy Database 10B and what the data can be used for.

If the document owner has not previously enrolled a document to Validation Privacy Server 10A there is no validation information for the submitted document in Validation Privacy Database 10B. If the requested activity is to use the submitted document for a low security purpose, such as purchasing an alcoholic beverage, Validation Privacy Server 10A will report to an operator at a document verifier terminal (1-$n$) 12 that the document has not been authenticated and validated and asks if the person wishes to enroll the document to Validation Privacy Server 10A. If the reply is "yes" Validation Privacy Server 10A then authenticates and validates the submitted document and stores the agreed to results in Validation Privacy Database 10B. If the authentication or validation indicates a problem with the submitted document a message is sent to the operator of the document verifier terminal 12 who submitted the document and they will take appropriate action. If the authentication or validation indicates no problems a message is sent to the operator of the document verifier terminal 12 that there is a "match" and the person who submitted the document is permitted to do what they have requested to do (e.g. purchase an alcoholic beverage). If an e-token is submitted and utilized in lieu of a previously validated document the above described validation process is not required.

The next time the person mentioned in the previous paragraph submits the same document for validation for the same purpose (e.g. purchasing an alcoholic beverage) Validation Privacy Server 10A first checks to see if the submitter of the document enrolled the document and its information is in Validation Privacy Database 10B. If the answer is yes the previous validation result stored in Validation Privacy Database 10B is retrieved and returned to a document verifier terminal (1-$n$) 12 as a "match" indication. The last mentioned person may complete their transaction. If an e-token is submitted and utilized in lieu of a previously validated document the above described validation process is not required.

In the event the person indicates that they do not want to enroll their document to Validation Privacy Server 10A the validation result is not stored in Validation Privacy Database 10B. If the document owner resubmits the same document at another time for the same purpose Validation Privacy Server 10A will not find a validation result entry stored in Database 10B and the resubmitted document must be revalidated. The operator of the document verifier terminal (1-$n$) 12 is permitted to use their own judgment for allowing low security risk actions, such as allowing the purchase of an alcoholic beverage, when by personal observation of the person submitting the document they know they are above minimum age, or they personally know the person and that they are of minimum age. For other higher security risk actions, such as cashing a check, the action may be blocked.

For all levels of document validation, from low security to high security, a document is first authenticated by a document verifier terminal (1-$n$) 12 at which it is submitted. The document is checked for security features, open and hidden, and the document is also checked to determine if the document is a counterfeit or has been altered. If the document passes this authenticity check various, pre-determined and appropriate governmental databases and other sources are checked and a "match" or "no match" validation result is returned from them via their trust authority servers 28$a$-$f$ and via Verification System Server 27 to Validation Privacy Server 10A to be stored in its Validation Privacy Database 10B, rather than being returned directly to the document verifier terminal (1-$n$) 12 from which the document validity request was initiated. Validation Privacy Server 10A returns the "match" or "no match" indication to the document verifier terminal (1-$n$) 12 at which the document was submitted. Such authentication is not required for an e-token.

If one or more biometrics were obtained from a person at their enrollment into Validation Privacy Server 10A, such biometrics are stored in Validation Privacy Database 10B and are used as tokens, instead of the actual government issued document used for validation enrollment to Validation Privacy Server 10A. Thereafter, when a biometric is submitted at a document verifier terminal (1-$n$) 12, rather than a previously validated document, to obtain approval to do something such as, but not limited to, purchasing an alcoholic beverage, Validation Privacy Server 10A utilizes some adjunct equipment (not shown) to match stored and submitted biometrics to determine if the person submitting the biometric is authorized to do whatever they are attempting to do by submitting their biometric.

In the embodiment of the invention described herein there are three reliance levels of validating submitted documents. Basically for the lowest level of document validation the fewest databases and other public sources are used for initial authentication and validation of a submitted document for enrollment under Validation Privacy Server 10A, and for the highest level of document validation the most databases and other public sources are used for authentication and validation of a submitted document for enrollment under Validation Privacy Server 10A. A particular enrollee to Validation Privacy Server 10A and its Validation Privacy Database 10B can choose to enroll at a level one, level two or level three but still limit the use of such enrollee's personal identity information (PII) to specific uses and disclosure protocols.

The first reliance level is typically to check the identity of a person based on a submitted document such as, but not limited to, a passport, drivers' license or military ID without either verifying the document using automated forensic techniques for authenticity or validating the document against an issuer trust authority database. Such identity check may be satisfied by the use of an e-token. It is obvious that for every day, low level transactions checking at the first reliance level is all that is necessary. Stated another way, reliance level one (low reliance—eg use a drivers license to purchase an alcoholic beverage) would require only validation by Validation Privacy Server 10A, using information stored in its Validation Privacy Database 10B, that a presented document is valid but otherwise no need for further query is required. These examples are for illustration only and the final operating protocol will vary from these examples. If an e-token is submitted and utilized in lieu of a previously validated document the above described validation process is not required.

The second reliance level is document verification using FIPS 201 standards where a document is checked to see if it is counterfeit and, if not counterfeit, are there any concerns about the documents issuance and the person to whom it was issued. Stated another way, reliance level two (medium reliance e.g. opening bank account) would require confirmation required under level one plus verification that the person's identity is a valid identity using a public or private database of actual identities.

The third reliance level is checking a high level document, such as a pass for access to a secure facility. Stated another way, reliance level three (e.g. high security employment or clearance) would require, in addition to the level one and level two validations, confirmation of background information obtained from public and private data bases. The use of e-tokens is very valuable in such high security applications.

In summary, determination of a reliance level to be used in document checking is made from a low reliance level to a high reliance level based on the enrollment of a Document Verifier Terminal 12 (1-n) from which a document verification request is received. Thus, the multi-level reliance checking, and the use of Validation Privacy Server 10A with its Validation Privacy Database 10B, or the use of an e-token, becomes the preferred method of completing commercial and or government identity document verification decisions with minimal exchange of personal identity information between the various servers and databases in the overall system. The result is minimal access to personal identity information from more secure government and non-government databases via their trust authority servers 28a-f, and the input from a person about their personal information in database servers and what such information can be used for, and a much more reliable system for identity and document checking is achieved with an increase in personal privacy.

While what has been described herein is the preferred embodiment of the invention those skilled in the art will recognize that numerous changes may be made without departing from the spirit and scope of the invention.

The invention claimed is:

1. Validation system that authenticates documents and/or information, including biometric information, submitted at a first terminal to obtain other documents, and the other documents are later submitted at a second terminal to receive permission to do a specific thing, and a verification system server that accesses ones of a plurality of trust authority servers with associated secure databases to access information stored in the secure databases to be used by the verification system server to test the authentication of the documents and information submitted at the first terminal while protecting the privacy of the person submitting the documents and information for authentication, the validation system comprising:

a validation privacy server connected to the first and second terminals and connected to the verification system server, the validation privacy server forwarding initial document and/or information authentication requests received from ones of the first terminals on to the verification system server for authentication processing using information the verification system server retrieves from ones of the trust authority servers and their associated databases, the validation privacy server receiving indications from the verification system server indicating only authentication or non-authentication of documents and/or information submitted to the verification system server for authentication processing, and the validation privacy server forwarding only the authenticity or non-authenticity indications received from the verification system server to the first terminal requesting authentication processing, and no information stored in the databases associated with the trust authority servers is ever returned by the verification system server to the validation privacy server;

a validation privacy database connected to the validation privacy server and in which the validation privacy server stores only the authenticity or non-authenticity indications that are returned from the verification system server to the validation privacy server the first time documents and/or information are submitted at one of the first terminals for authentication processing; and wherein when an other document generated at the first terminal is subsequently submitted at any time and on different dates in the future by a person at a second terminal to obtain permission at the any time and different date to do the specific thing for which the other document has been issued, the last mentioned second terminal forwards information on the subsequently submitted other document to the validation privacy server which checks the validation privacy database for a previously stored authenticity indication and, if there is a previously stored authenticity indication in the validation privacy database the validation privacy server returns the previously stored authenticity indication to the last mentioned second terminal, and if there is no previously stored authenticity indication in the validation privacy database for the submitted other document the validation privacy server returns an indication to the last mentioned second terminal that there is no previously stored authenticity indication in the validation privacy database to report to the second terminal, thus minimizing authentication processing by the verification system server and the trust authority servers.

2. The validation system of claim 1 wherein when a document and/or information that is being submitted at a second terminal to do the specific thing has not been previously authentication processed so an authenticity indication of either authentication or non-authentication is not stored in the validation privacy database, with the approval of the document owner the validation privacy server forwards an authentication request to the verification system processor server to perform authentication processing on the information and/or document using the trust authority servers and their associated databases, and the validation privacy server returns the result of the authentication processing to the second terminal and stores the indication of either authentication or non-authentication in its validation privacy database.

3. The validation system of claim 1 where an e-token may be submitted at a terminal in lieu of a document that has to be validated by the Validation Privacy Server in order to obtain permission to do something.

4. The validation system of claim 2 where an e-token may be submitted at a terminal in lieu of a document that has to be validated by the Validation Privacy Server in order to obtain permission to do something.

5. The validation system of claim 1 wherein when an other document that was generated at a first terminal is later submitted at a second terminal to receive approval to do the specific thing has no stored authenticity indication of validity or non-validity in the validation privacy database, the validation privacy server sends a notification the last mentioned second terminal.

6. The validation system of claim 5 wherein when the validation privacy server receives an authentication request from the terminal to authenticate information on the submitted document, the validation privacy server receives information from the terminal as to the type of the submitted document and the specific information thereon that is to be authenticated and then uses the verification system server to access the trust authority server and associated database that handles the specific type of document and to authenticate only the specific information on the submitted document and thereby provide privacy for any other information in the database regarding the submitted document.

7. The validation system of claim 1 wherein before the validation privacy server can store in its validation privacy database specific information retrieved from a trust authority server and its database, such as a picture or fingerprints to be used by an operator at a first terminal as part of authenticating documents submitted to obtain other documents, or by an operator at a second terminal when an other document is submitted at the terminal to obtain permission to do a specific thing, the validation privacy server must first obtain the approval of the person who submitted the document and other/or other information as to what specific information from a trust authority server and its database may be stored in the validation privacy database and for what specific purpose the stored specific information may be used.

* * * * *